W. E. MOLINS

CUTTING MECHANISM

Dec. 29, 1931.

Re. 18,300

Original Filed Oct. 28, 1927

3 Sheets-Sheet 1

INVENTOR

By Walter E. Molins.

Watson, Cole, Grindle & Watson

ATTY'S

W. E. MOLINS

Dec. 29, 1931. CUTTING MECHANISM Re. 18,300

Original Filed Oct. 28, 1927 3 Sheets-Sheet 2

INVENTOR
Walter E. Molins.
By Watson, Coit, Morse & Grindle
ATTYS.

W. E. MOLINS

Dec. 29, 1931. CUTTING MECHANISM Re. 18,300

Original Filed Oct. 28, 1927 3 Sheets-Sheet 3

INVENTOR

By Walter E. Molins,

Watson, Cole, Grindle & Watson

ATTYS.

Reissued Dec. 29, 1931

Re. 18,300

UNITED STATES PATENT OFFICE

WALTER EVERETT MOLINS, OF LONDON, ENGLAND

CUTTING MECHANISM

Original No. 1,759,018, dated May 20, 1930, Serial No. 229,479, filed October 28, 1927, and in Great Britain November 8, 1926. Application for reissue filed October 5, 1931. Serial No. 567,081.

The present invention consists in providing means for automatically severing a wrapper from a web of material.

This wrapper is suitable for use in the production of a U shaped block ended container which may be automatically formed, for example by the method and means described in U. S. Patents Nos. 1,468,246 and 1,517,307. The container is preferably formed from a thin transparent wrapper of rectangular shape which is provided at one end with a tongue, for example of semi-circular formation, and at the other end with a cut-away portion similar in shape to the semi-circular tongue at the other end of the wrapper.

While the invention defined in the claims in this application is directed primarily to the means for severing individual wrappers from a continuous web of material, the purpose of the invention claimed may be more clearly understood by a brief description of the machine of which this cutting mechanism forms a component part and the machine in question is therefore described briefly hereinafter.

The invention will be more particularly described with reference to the accompanying drawings, in which Figure 1 illustrates diagrammatically a machine constructed according to the present invention;

Figure 1:
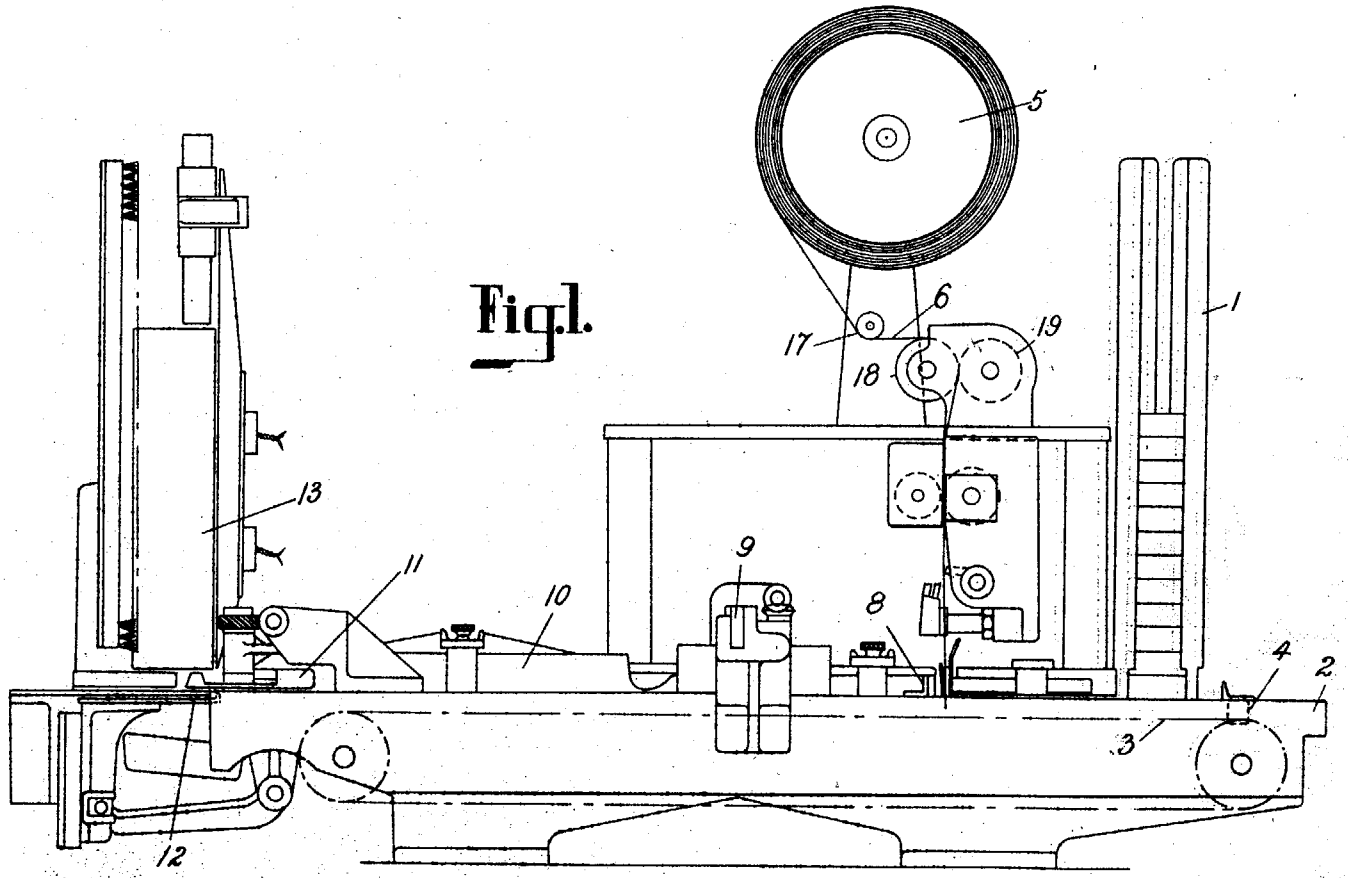

Referring to Figure 1, a magazine 1 is adapted to receive packets containing cigarettes and feed the same by gravity to the bed 2 of the machine. Mounted beneath the bed of the machine is an endless conveyor 3 which carries pusher pieces 4 adapted to travel in a slot formed in the bed of the machine. Each pusher piece 4 is adapted to engage with the lowermost packet in the magazine 1 and carry the same along the bed of the machine. Mounted in advance of the magazine 1 and above the bed of the machine is a reel 5 which carries a web of thin transparent paper 6 which is arranged to be fed downwardly through a slot 7 (Figure 3) in the bed of the machine by the feeding and cutting gear, hereinafter described with reference to Figures 2 and 3.

Immediately the wrapper has been severed from the web the pusher piece 4 conveys the packet of cigarettes and the wrapper through folders 8, gumming gear 9 and heated guides 10 to tucking mechanism 11 which transfers the packet to a rising platform 12 which pushes the packet vertically into a stacker 13.

The folding, gumming, tucking and stacking mechanisms are preferably constructed according to prior U. S. Patents Nos. 1,468,246; 1,517,307; 1,651,146, and application Ser. No. 163,520 to which reference may be had.

Figure 2:
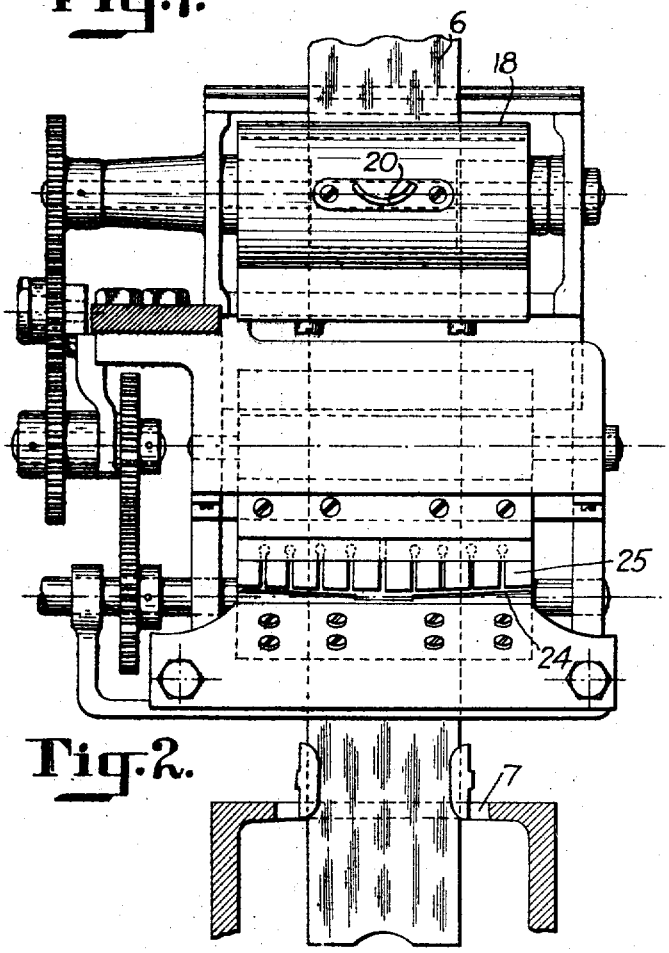
Figure 2 illustrates in detail the wrapping, feeding and cutting mechanisms looking in the direction of the arrow A in Figure 3.
Figure 3:
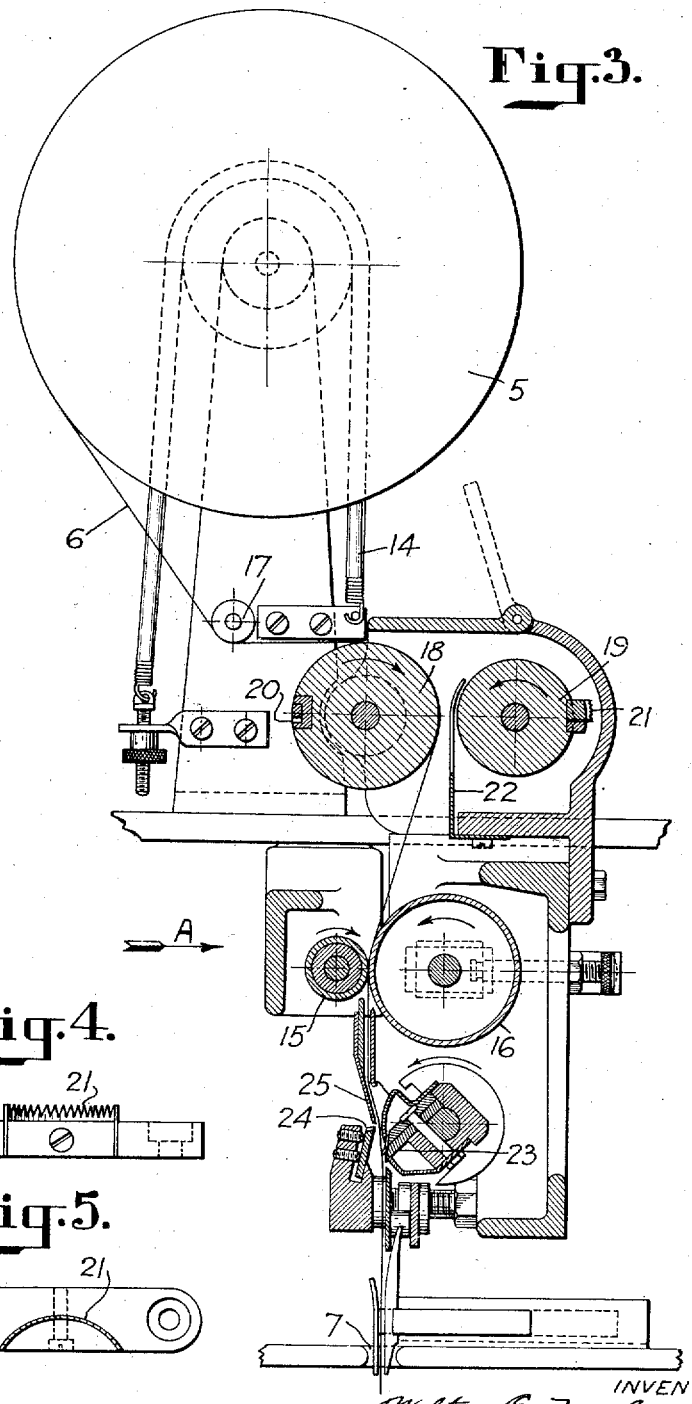
Figure 3 is a side elevation of Figure 2 showing the reel of wrapping material.
Figure 4:
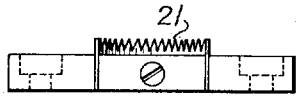
Figures 4 and 5 illustrate in elevation and plan respectively a detailed view of the cutting device.
Figure 5:
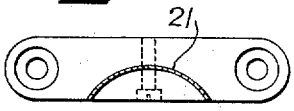

Referring to Figures 2 and 3 which illustrate the feeding and cutting mechanisms, the web of wrapping material 6 (Figure 3) is drawn from a reel 5, provided with a friction band 14, by means of a pair of continuously rotating rollers 15 and 16. The web passes around a guide 17 and between rollers 18 and 19. The roller 18 is provided with an arc shaped groove 20 which is arranged to engage with a serrated cutter 21, which is adapted to make an arc-shaped perforation at the middle of the web, mounted upon the roller 19. This cutter 21 is illustrated in detail in Figures 4 and 5.

The rollers 18 and 19 are adapted to rotate in the directions indicated by the arrows so that the cutter 21 cooperating with the groove 20 in the roller 18 makes an arc-shaped perforation or slit in the web 6.

A guide 22 is provided to facilitate the initial threading of the web through the rollers 18 and 19. The rollers 15 and 16 feed continuously the perforated web downwardly through the slot 7 in the bed of the machine in the manner described in U. S. Patent No. 1,468,246.

Beneath the rollers 15 and 16 is mounted a cutting mechanism comprising a rotatable blade 23 which cooperates with a fixed blade 24. The cutting mechanism is preferably constructed according to British Patent No. 190,202 and U. S. Patent 1,631,879, with the blades slightly modified in shape so as to make allowance for the slit or perforated portion hereinbefore referred to.

It will be observed in Figure 2 that the edge of the fixed blade 24 has two portions which slope towards a central cut-away section thereof which is made equal in width to the chord of the arc-shaped perforations previously mentioned. The edge of the rotating blade 23 cooperates simultaneously with the two portions of the fixed blade which slope towards the central cut-away section so as to cut from the sides of the web and terminate on each side of the tongue. A spring interceptor 25 of the type described in U. S. Patent No. 1,631,879, is preferably provided so as to ensure that the leading edge of the web does not foul the fixed cutting blade.

Figure 7:
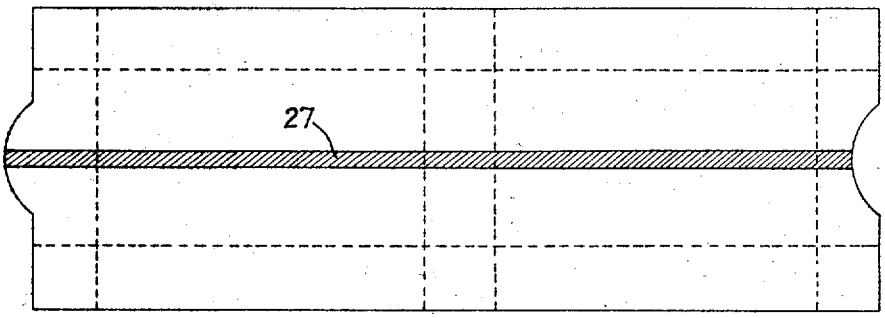
Figure 7 shows a blank from which the wrapper is formed.
Figure 6:
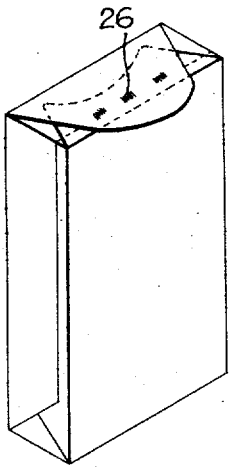
Figure 6 is a perspective view of a wrapped packet.

When the rollers 15 and 16 have fed sufficient material downwards through the slot 7 in the bed of the machine, the knife 23 cuts the web from each side up to the edge of the arc-shaped perforation. When the cigarette packet meets the web the tension produced in the web as it is pushed through the folders causes it to break at the perforated portion, so that the cut blank is of the form shown in Figure 7. The packet passes through the folding, gumming and tucking mechanism and is pushed up into the stacker in the form shown in Figure 6, gum being applied as shown at 26.

The tongue which extends beyond the broad face of the container being of a single thickness of paper is extremely flexible and any unintentional displacement of the same will not affect the joint between the two final broad end flaps.

It will be appreciated that in the case of a packet enveloped in an outer container of thin transparent material, a narrow strip 27 (Figure 7) of colored paper may be fed with the transparent material, in such a manner that the same is located at the point where the tongue and the cut-away portion are formed, and the tongue will, in consequence, be provided on its under-side with a narrow band which will facilitate the removal of the outer transparent wrapper from around the inner packet.

Thus it will be seen that according to the present invention there is provided a machine arranged to form a U shaped block ended container provided with an extension to the final broad end flap which is formed without employing any more wrapping material than is necessary to form a container upon which no extension of the final broad end flap is formed.

Having thus described the invention, what is claimed as new and desired to be secured by Letters Patent is:

1. A device for use on a wrapping machine of the type wherein a batch of cigarettes or like articles is enveloped in a wrapper comprising means for feeding a wrapping web, means for forming an arc-shaped series of perforations in the central portion of the moving web, and means for thereafter slitting said web from each edge thereof to the nearest perforation.

2. In apparatus of the class described, the combination with means for feeding a strip of wrapping material, of means for forming a series of perforations adjacent the central portion of said moving strip, and means for severing the strip from each edge inwardly to the perforated portion.

3. In apparatus of the class described, the combination with a rotating member having a serrated cutting portion, of means for feeding a flexible web across said member to form a series of perforations in the central portion thereof, and mechanism for slitting said web on each side of the series of perforations.

4. In a wrapping machine, the combination with means for feeding a web of wrapping material, of a rotating serrated cutter for engaging said moving web to form a series of perforations adjacent the central portion thereof, and severing means for engaging said web adjacent the perforated portion, said severing means having a width equal to the width of the web and having a central portion equal in width to the serrated cutter removed therefrom.

5. A device for use on a wrapping machine comprising means for feeding a web of wrapping material, a rotating element having a serrated arcuate blade portion of less width than the web for forming a series of arcuately arranged perforations adjacent the central portion of the moving web, and means for slitting the web from each edge inwardly to the arcuately arranged perforations.

6. A device for use on a wrapping machine comprising means for feeding a web of wrapping material, a rotating element having a serrated arcuate blade portion of less width than the web for forming a series of arcuately arranged perforations adjacent the central portion of the moving web, and a cutting edge having a width equal to the width of the web and having a portion equal to the width of the said arcuate blade portion removed therefrom for engaging and slitting the web on each side of the arcuately arranged perforations.

7. A device for use on a wrapping machine comprising means for feeding a web of wrapping material, a rotating element having a serrated arcuate blade portion of less width than the web for forming a series of arcuately arranged perforations adjacent the central portion of the moving web, and mechanism including a pair of fixed blades for engaging and slitting the web on each side of the arcuately arranged perforations, said blades being disposed at an acute angle to the path of movement of the web.

8. A device for use on a wrapping machine of the type wherein a batch of cigarettes or like articles is enveloped in a wrapper comprising means for feeding a wrapping web, means for puncturing the web adjacent the central portion thereof, and means for slitting said web from each edge thereof toward the punctured portion, the web being so cut as to leave a frangible connection.

9. In apparatus of the class described, the combination with means for feeding a strip of wrapping material, of means for perforating the central portion of said strip, and separate means spaced from said last named means along the path of travel of the strip for severing the strip from each edge inwardly toward the perforated portion.

10. A device for use on a wrapping machine of the type wherein a batch of cigarettes or like articles is enveloped in a wrapper comprising means for feeding a wrapping web, means for periodically puncturing the central portion of the web while the latter is in motion and separate means spaced from said first named means along the path of travel of the web for cutting the web from each edge to the central punctured portion.

11. In apparatus of the class described, the combination with a rotating member having a portion of its surface provided with web puncturing means, of means for feeding a flexible web across said member to periodically perforate the central portion of the web and separate means for cutting said web from each edge thereof toward the perforated portion.

12. In apparatus of the class described, the combination with means for feeding a strip of wrapping material, of means for cutting the strip inwardly from each edge thereof, and separate means spaced from said first named means in the direction of travel of the web for puncturing the central portion of the strip to form a tongue-like projection therein.

In testimony whereof I hereunto affix my signature.

WALTER EVERETT MOLINS.